Figure 1:
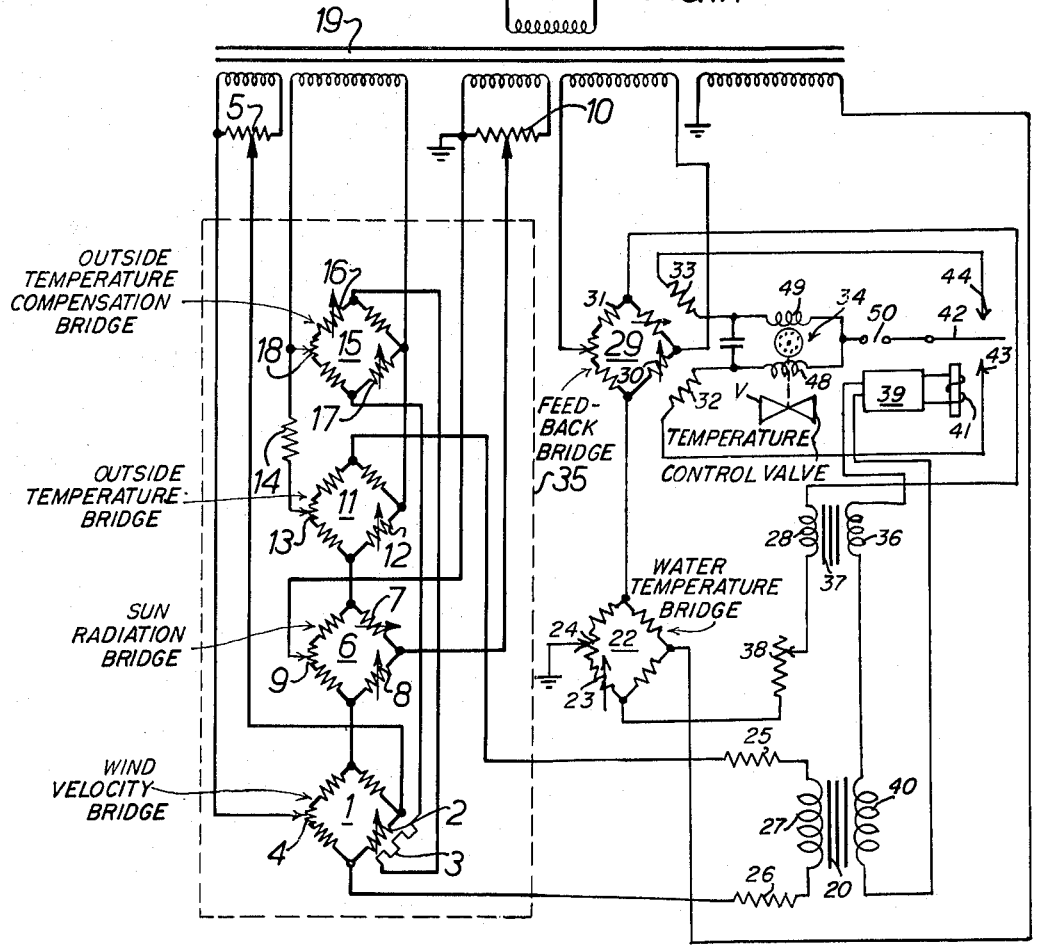

April 19, 1966   F. L. F. STEGHART ETAL   3,246,839
DEVICE FOR CONTROLLING A CENTRAL HEATING SYSTEM
Filed June 26, 1962                                        3 Sheets-Sheet 2

INVENTORS:
FRITZ LUDWIG FELIX STEGHART
TREVOR EXELBY OLIVER
By
E. M. Squire
ATTY.

INVENTORS:
FRITZ LUDWIG FELIX STEGHART
TREVOR EXELBY OLIVER

BY

E. M. Squire
ATTY.

United States Patent Office 3,246,839
Patented Apr. 19, 1966

3,246,839
DEVICE FOR CONTROLLING A CENTRAL HEATING SYSTEM
Fritz Ludwig Felix Steghart, Gerrards Cross, and Trevor Exelby Oliver, Windsor, England, assignors to Satchwell Controls Limited, Slough, England, a company of Great Britain
Filed June 26, 1962, Ser. No. 205,338
Claims priority, application Great Britain, June 26, 1961, 23,111/61
7 Claims. (Cl. 236—91)

This invention relates to improvements in control devices for controlling the heating system of a building, and, in particular an improvement in or modification of the invention described in the specification of co-pending application Serial No. 91,096, filed on February 23, 1961, which is now Patent No. 3,150,826, issued on September 29, 1964 to Fritz Ludwig Felix Steghart and Peter Leslie Kershaw, the patent being assigned, like this patent, to Satchwell Controls Limited (formerly known as The Rheostatic Company Limited).

It is conventional to provide heating systems of the kind, referred to hereinafter as "of the kind described," in which a heat source supplies heat to a heating fluid such as steam, water or air which is circulated through a pipe or conduit system to convey heat from the source to the rooms within the building.

In heating systems of the kind described it is known to provide means for measuring the heat losses from a building and to control the heat source in dependence upon those losses.

The heat losses from a building fall into two main categories; conduction losses through the fabric and infiltration losses due to air passing through the building by way, for example, of the apertures around imperfectly fitting doors and windows. It can be shown that over normal ranges of temperature and also over normal ranges of the speed of wind striking the outside of the building the total losses can be regarded as having two components, the first being proportional to the temperature difference between the inside and outside of the building and the second being proportional to the product of that temperature difference and a function of the wind speed.

According to the invention, a control device for a heating system of the kind described and comprising means providing a first signal dependent upon the difference between the temperature of the heating fluid and a first pre-set temperature, means providing a second signal dependent upon the difference between the outside temperature and a second pre-set temperature, product measuring means providing a third signal dependent upon the product of a linear function of the wind speed and the approximate difference between the outside temperature and a third adjustably pre-set reference temperature and temperature control means responsive to a difference signal dependent upon the difference between the first signal and the sum of the second and third signals to change the temperature of the heating fluid in a sense to reduce the difference is characterised in that the product measuring means comprises a first circuit having at least a first temperature sensitive element disposed in one branch and exposed to outside temperature, the first circuit providing a fourth signal dependent upon the difference between the outside temperature and a fourth pre-set temperature, and a second circuit having a second temperature sensitive element disposed in one branch and exposed to wind outside the building and heated to approximately the third pre-set temperature when the wind speed is zero by a heater element energized by the fourth signal, the second circuit providing the third signal.

Figure 2:
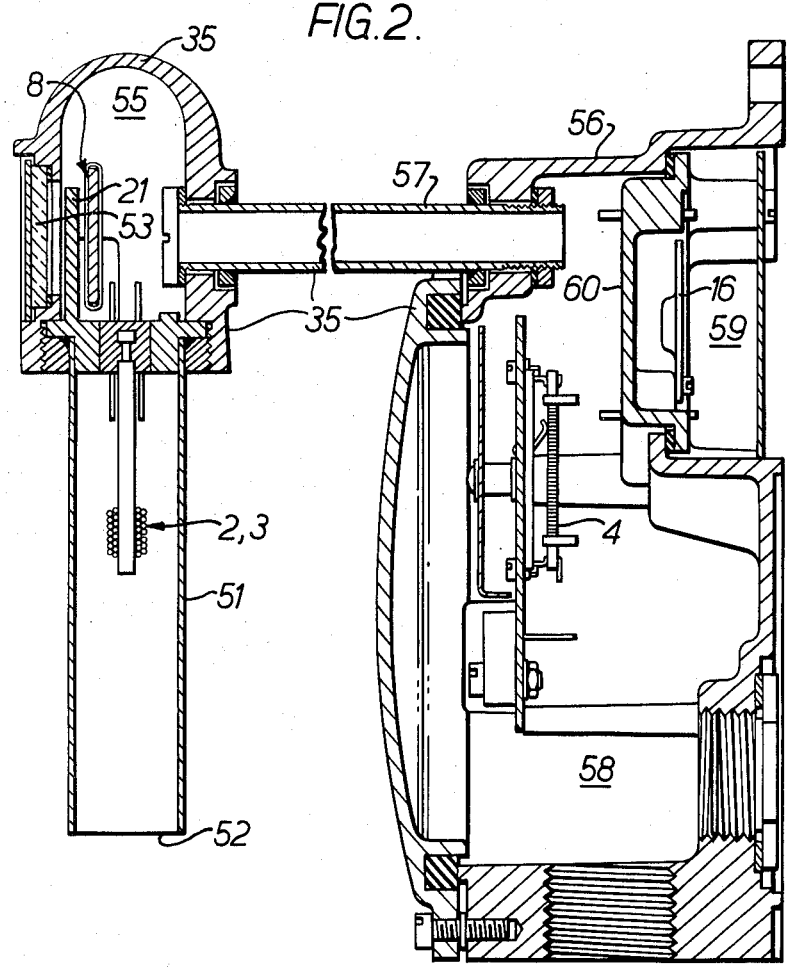
Figure 3:
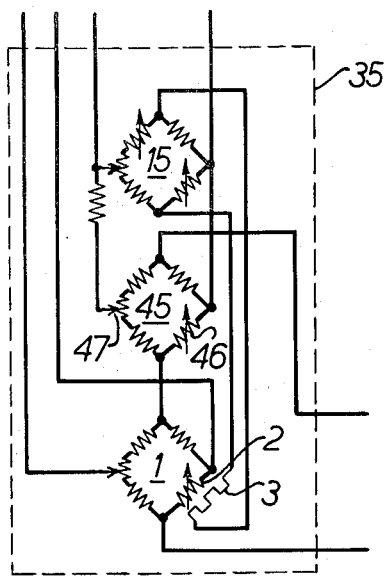
Figure 4:
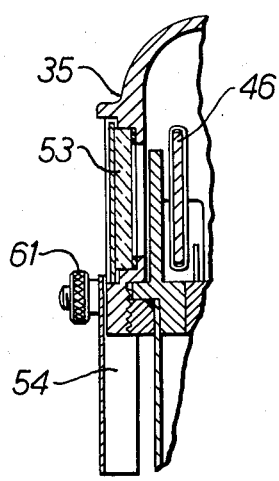

Embodiments of the invention will now be described by way of example, with reference to the accompanying drawings, of which:

FIGURE 1 is the circuit diagram of one embodiment;
FIGURE 2 shows a vertical section through the housing shown schematically in FIGURE 1;
FIGURE 3 is a modifiaction of part of the circuit diagram of FIGURE 1; and
FIGURE 4 shows a vertical section through a portion of the housing shown schematically in FIGURE 3.

In the different figures corresponding elements are indicated by the same reference numeral.

As shown in FIGURE 1, four resistance bridges 1, 6, 11 and 15 are provided in a housing 35 positioned outside but adjacent to one of the walls of the building, and a fifth resistance bridge is located inside the building. The bridges 22, 11, 1 and 15 each include at least one temperature sensitive element shown as a resistor traversed by an arrow and are arranged to balance when the corresponding temperature sensitive element or elements are at a first, a second, a third and a fourth adjustably pre-set reference temperature respectively.

The bridge 1, referred to herein as the wind bridge, has in one arm a temperature sensitive resistor 2 and is energized from a potential divider 5 connected across one secondary winding of a transformer 19. The resistor 2 has a heater element 3 in close proximately to it, the resistor 2 and heater element 3 being both wound, as indicated in FIGURE 2, on a common support coaxially positioned in a tube 51 which forms part of the housing 35 and which is open at one end and providing a hole 52 through which wind may enter and pass relatively freely over the resistor 2 and heater 3.

The heater element 3 is supplied with energy from the bridge 15 (FIGURE 1) which has two temperature sensitive resistors 16 and 17 in diametrically opposed arms and which is energized from a second secondary winding of the transformer 19. The resistors 16 and 17 are protected from the wind but are exposed to the temperature outside the building, the bridge 15 being adjusted to balance when the outside temperature is equal to the fourth pre-set temperature which is adjusted by means of the potential divider 18 and the bridge 15 to have a value such that when the outside temperature differs from the fourth pre-set temperature the energy supplied to the heater element 3 is such as to maintain the temperature of the resistor 2 approximately constant at the third pre-set temperature as the outside temperature varies provided that the wind speed is zero.

The wind bridge 1 is adjusted to balance with zero wind velocity when the resistor 2 is at the third pre-set temperature by means of the potential divider 4. When the wind speed differs from zero, however, the resistor 2 is cooled by air flowing over it, causing the wind bridge 1 to become unbalanced to an extent which varies in accordance with the wind speed and also varies in accordance with the difference between the temperature of the wind and the third pre-set temperature. The output signal of the wind bridge 1 thus varies in accordance both with the outside wind velocity and with the approximate difference between the outside temperature and the third pre-set temperature.

The tube 51 and hole 52 are preferably so proportioned and the resistor 2 and heater element 3 are so positioned with the tube 51 that the cooling of the resistor 2 due to wind is such that the output of the wind bridge 1 is substantially proportional to the product of a linear function of the wind speed and the difference between the outside temperature and the third pre-set reference temperature. The wind bridge 1 thus operates as a product measuring device, the output being substantially zero when the wind velocity is zero or when the temperature difference is zero between the outside temperature and the third reference temperature.

The bridge 6, referred to herein as the sun bridge, has two temperature sensitive resistors 7 and 8 in adjacent arms having connection with one input terminal and is energised from a potential divider 10 connected across a third secondary winding of the transformer 19. This bridge is so adjusted by means of potential divider 9 that its output is zero when the resistors 7 and 8 are at the same temperature. The resistor 7 is shielded from solar radiation and the resistor 8 is, as indicated in FIGURE 2, positioned near a window 53 in the housing 35 and is heated when solar radiation enters this window. The output of the sun bridge is proportional to the intensity of solar radiation.

The bridge 11 (FIGURE 1) referred to herein as the outside temperature bridge, has a temperature bridge, has a temperature sensitive resistor 12 in one arm and is energised from the previously mentioned second secondary winding of transformer 19, via a fixed resistor 14. This bridge measures the outside air temperature and is adjusted to balance when the outside temperature is equal to the second pre-set temperature by means of potential divider 13. The bridge 11 could, of course, be energised from a further secondary winding of transformer 19.

The outputs of the wind, sun and outside temperature bridges 1, 6 and 11, respectively, are connected in series and the phase of their energization and the positions of the temperature sensitive elements in the respective bridges are such that, when the outside temperature is less than the desired inside temperature and the wind bridge 1, the sun bridge 6 and the outside temperature bridge 11 are all providing output signals, the output signals of the wind bridge 1 and the outside temperature bridge 11 are in the same phase and the output signal of the sun bridge is in antiphase to the other two. The combined output signal is supplied to the primary winding 27 of transformer 20 via the resistors 25 and 26, these resistors being of equal value in order to reduce unwanted pick-up and their value being selected in accordance with the average climatic conditions to which the building is exposed. By suitable adjustment of the potential dividers 5 and 10 the relative magnitudes of the components of signal applied to the primary winding 27 are adjusted to suit the building.

The indoor bridge 22, referred to herein as the hot water bridge, has a temperature sensitive resistor 23 in one arm arranged to measure the temperature of the hot water, which is, in this embodiment, the heating fluid. This bridge is energised from a fourth secondary winding of the transformer 19. The output of this bridge is connected in series with a variable resistor 38 and the output of a feedback bridge 29 to the primary winding 28 of a transformer 37. The secondary winding 36 of this transformer is connected in series with the secondary winding 40 of transformer 20 to the input of an amplifier 39. The hot water bridge 22 is adjusted to balance when the hot water is at a first adjustably pre-set reference temperature by means of the potential divider 24.

The output of the amplifier 39 is connected to the energizing winding 41 of a motor relay having a three-position contact 42 which occupies a neutral position when the input signal to the amplifier is zero. The amplifier 39 is phase sensitive and is effective to energize the relay winding 41 to cause the contact 42 to make with a fixed contact 43 when the signal applied to the input of the amplifier 39 is of one phase and with a fixed contact 44 when the latter signal is of opposite phase.

When the contact 42 makes with contact 43 it energizes one winding 48 of a split phase motor 34 from a source of alternating current 50 to cause the motor 34 to drive in one direction and when the contact 42 makes with contact 44 it energizes the other winding 49 of the motor 34 from the source 50 to cause the motor 34 to drive in a reverse direction. When the contact 42 is in its neutral position both windings 48 and 49 are unenergized and the motor 34 is stationary.

The motor 34 is operatively connected to a valve V which controls, for example, the flow of heat from a source (not shown) to the hot water which heats the building so as to maintain the temperature of the hot water at a value determined by the signal applied to the primary winding 27 of transformer 20.

Resistors 32 and 33, which are of low resistance, are connected in series with the windings 48 and 49 respectively of the motor 34. These resistors are in close proximity, as indicated in dotted lines, to the temperature sensitive resistors 30 and 31 of the feedback bridge 29 and operate as heaters during operation of the motor 34. This feedback bridge is energized from a fifth secondary winding of transformer 19 and it is adjusted to balance when resistors 32 and 33 are at the same temperature. When the motor 34 is driven in one direction as a result of a suitable signal being applied to the input of the amplifier 39 the corresponding one of the resistors 32 and 33 is heated by the motor current passing through it. This causes the bridge 29 to become unbalanced in a sense such that the input signal to the amplifier is reduced, causing the motor 34 to stop. During the ensuing interval of time that one of the resistors 30 and 31 which had previously been heated now cools and the input signal to the amplifier 39 increases towards its original value, causing the motor 34 to drive further in the original direction. This stepping process continues until the motor 34 has moved sufficiently to restore the water temperature to the value determined by the signal applied to the primary winding 27.

As shown in FIGURE 2, the resistor 8 is shielded from direct solar radiation by means of a mask 21. Solar radiation entering the window 53 falls on this mask and heats it, the heating of this mask causes the temperature of air in the hermetically sealed chamber 55 to rise and this, in turn, heats the resistor 8.

The housing 35 comprises a main body 56 which is adapted to have its right-hand face, as shown in FIG. 2, clamped against the outside wall of the building. Projecting leftwardly from this main body 56 is a tube 57 which supports the tube 51 at a sufficient distance from the wall of the building to ensure that the tube 51 is not shielded from the wind. The tube 57 also serves as a conduit through which pass electrical connections between the components located adjacent opposite ends of the tube, but for simplicity these connections are not shown in FIGURE 2. The main body 56 is divided into two chambers 58 and 59 by means of a partition 60. Potential dividers 4, 9, 13 and 18 are mounted in chamber 58 and resistors 7, 12, 16 and 17 are mounted in chamber 59 but of these only potential divider 4 and resistor 16 are shown in FIGURE 2.

In the embodiment of which part of the circuit is shown in FIGURE 3 a wind bridge 1 similar to the wind bridge 1 of FIGURE 1 is connected in series with a bridge 45 having a temperature sensitive resistor 46 in one arm. Both these bridges are located in a housing 35 similar to that described above with reference to FIGURE 1 and positioned outside and adjacent to one of the walls of the building. The resistor 46 is positioned, as shown in FIGURE 4, near a window 53 in the housing 35 and is heated when solar radiation enters this window. A sun shield 54 is adjustably mounted on the housing 35 and permits the heating of the resistor 46 for a given intensity of solar radiation to be pre-set. The shield 54 is locked in a suitable position by means of the nut 61. The arrangement is such that the balance condition of bridge 45 (FIGURE 3), which is adjustable by means of potential divider 47, is dependent not only upon the intensity of solar radiation but also upon the difference between the outside temperature and a second pre-set temperature corresponding to the second pre-set temperature referred to above. The bridge 45, therefore, replaces the bridges 6 and 11 of FIGURE 1 and apart from this change the circuit is as shown in FIGURE 1.

The resistors 32 and 33 and the bridge 29 cooperate with the amplifier 39 and motor 34 to provide a form of control known as a "floating control."

The bridges 1, 6, 11, 15, 22 and 29 could, alternatively, be energised by direct current instead of by alternating current, the outputs of the bridges being suitably connected, in a manner which will be apparent to one skilled in the art, to the input of an amplifier which takes the place of the amplifier 39 and which is sensitive to the polarity of the signal applied to it.

In the arrangements described above with reference to FIGURES 1 and 2 the bridge 15 has two arms which include temperature sensitive resistors. Provided that this bridge 15 provides sufficient energy to the heater element 3 to maintain the temperature of the resistor 2 at approximately the third predetermined temperature when the wind speed is zero this bridge may, alternatively, have only one arm which is temperature sensitive.

In the arrangements described above with reference to FIGURES 1 and 2 the resistors 16 and 17 are preferably thermistors.

We claim:

1. A temperature control device for a building heated by a heating fluid comprising: first sensing means to develop a first electrical signal in accordance with the difference between the temperature of said heating fluid and a first preset temperature; second sensing means to develop an electrical signal in accordance with the difference between the temperature outside said building and a second present temperature; product measuring means providing a third electrical signal in accordance with the product of a function of the speed of wind outside said building and the approximate difference between the temperature outside said building and a third preset temperature, the wind exerting a cooling effect upon said building; third sensing means to develop a fourth electrical signal in accordance with intensity of solar radiation incident upon the building; means to develop an error signal representing the difference between the sum of the first and fourth electrical signals and the sum of the second and third electrical signals; and temperature control means connected for response to the error signal and operative to alter the temperature of the heating fluid in a sense to reduce the error signal.

2. A control device according to claim 1, wherein said temperature control means comprises an amplifier to the input of which said error signal is applied and thermal feedback means responsive to the output signal of the amplifier to reduce periodically the signal applied to the input of the amplifier.

3. A device according to claim 1, wherein the third sensing means comprises a temperature sensitive means positioned for response to solar radiation; a bridge circuit having said temperature sensitive means connected as one arm thereof; a housing enclosing said temperature sensitive means, said housing having a window therein for admitting solar radiation for heating said temperature sensitive means.

4. A control device according to claim 3, further comprising mask means within said housing and intercepting solar radiation entering through said window, said mask means being heated by said intercepted radiation for heating the interior of said housing to raise the temperature of said temperature sensitive means.

5. A control device according to claim 3, further comprising adjustable means cooperating with said window for regulating the amount of solar radiation which enters said window.

6. A control device for a heating system for heating the interior of a building by means of a heating fluid within the building, said control device comprising: first temperature sensitive means within said building providing a first signal the magnitude and polarity of which varies in accordance with the deviation of an internal temperature of said building from a first reference temperature; second temperature sensitive means outside said building providing a signal the magnitude and polarity of which varies in accordance with the deviation of the ambient temperature outside said building from a second reference temperature; a control circuit to which said first and second temperature sensitive means are connected; a Wheatstone bridge circuit having a continuously energized input and an output which provides a third signal, said output being connected to said control circuit, the magnitude and polarity of said third signal varying in accordance with the magnitude and direction of unbalance of said bridge; a pair of temperature sensitive resistors included in said bridge, said bridge being balanced when the resistances of said resistors are equal; control means for varying the temperature of said heating fluid; an energizing circuit for said control means; a pair of heating resistors included in said energizing circuits, each of said heating resistors being positioned to heat one of the temperature sensitive resistors of said pair, one of said heating resistors being energized during operation of said control means in one direction and the other being energized during operation in the opposite direction, both heating resistors being deenergized when said control means is idle; means connecting said control circuit to said control means for operation thereof to increase said temperature within said building when the outside temperature decreases and vice versa for maintaining the interior of said building at a constant temperature, the one of said heating resistors which is energized unbalancing said bridge to cause said third signal to stop the operation of said control means.

7. A control device according to claim 6, wherein said control means comprises a reversible motor provided with two windings, the motor rotating in one direction when one winding is energised and in a reverse direction when the other winding is energized, each winding being energised in series with one of said heating resistors.

References Cited by the Examiner
UNITED STATES PATENTS

| 1,276,589 | 8/1918 | Steinmetz. | |
| 2,246,575 | 6/1941 | Coleman. | |
| 2,278,633 | 4/1942 | Bagnall | 236—69 X |
| 2,545,390 | 3/1951 | Spahn. | |
| 2,836,364 | 5/1958 | Ashley | 236—1 |

FOREIGN PATENTS

| 508,266 | 6/1939 | Great Britain. |
| 809,203 | 2/1959 | Great Britain. |
| 57,237 | 4/1946 | Netherlands. |

ALDEN D. STEWART, *Primary Examiner.*

EDWARD J. MICHAEL, WILLIAM F. O'DEA,
*Examiners.*